(12) United States Patent
Mattice et al.

(10) Patent No.: US 7,247,014 B2
(45) Date of Patent: Jul. 24, 2007

(54) COMPRESSION MOLDING MACHINE

(75) Inventors: Daniel L. Mattice, Columbia City, IN (US); David C. Thompson, Grabill, IN (US); Wendell D. Willingham, Perrysburg, OH (US); B. Jack Rote, Sturgis, MI (US)

(73) Assignee: Owens-Illinois Closure, Inc., Perrysburg, OH (US)

( * ) Notice: Subject to any disclaimer, the term of this patent is extended or adjusted under 35 U.S.C. 154(b) by 159 days.

(21) Appl. No.: 11/156,115

(22) Filed: Jun. 17, 2005

(65) Prior Publication Data

US 2006/0286192 A1 Dec. 21, 2006

(51) Int. Cl.
*B29C 31/04* (2006.01)
*B29C 43/06* (2006.01)

(52) U.S. Cl. ............... 425/297; 425/305.1; 425/348 R; 425/809

(58) Field of Classification Search ................ 425/350, 425/351, 418, 422, 438, 441, 443, 809, DIG. 58, 425/297, 305.1; 249/59; 264/318
See application file for complete search history.

(56) References Cited

U.S. PATENT DOCUMENTS

| | | | |
|---|---|---|---|
| 3,782,329 A | 1/1974 | Everett | |
| 3,867,081 A | 2/1975 | Everett | |
| 3,955,605 A | 5/1976 | Zupan | |
| 4,060,053 A | 11/1977 | Ohmi | |
| 4,080,136 A | 3/1978 | Peller | |
| 4,277,431 A | 7/1981 | Peller | |
| 4,287,847 A | 9/1981 | Ohmi | |
| 4,640,673 A | 2/1987 | Takeda et al. | |
| 4,755,125 A | 7/1988 | Takeda et al. | |
| 5,292,240 A | 3/1994 | Capelle | |
| 5,370,519 A | 12/1994 | Shapcott | |
| 5,386,971 A | 2/1995 | Ingram | |
| 5,456,587 A | 10/1995 | Ingram | |
| 5,596,251 A | 1/1997 | Miller | |
| 5,603,964 A | 2/1997 | Rote et al. | |
| 5,611,983 A | 3/1997 | Ma et al. | |
| 6,368,094 B1 | 4/2002 | Dennis et al. | |
| 6,422,854 B1 | 7/2002 | Dennis et al. | |
| 6,478,568 B2 * | 11/2002 | Ingram | ...... 425/297 |
| 2004/0166193 A1 | 8/2004 | Parrinelo et al. | |
| 2005/0241721 A1 | 11/2005 | Ritz et al. | |

FOREIGN PATENT DOCUMENTS

| | | |
|---|---|---|
| WO | 2005/039853 | 5/2005 |
| WO | 2005/102640 | 11/2005 |

* cited by examiner

*Primary Examiner*—Yogendra N. Gupta
*Assistant Examiner*—Thu Khanh T. Nguyen

(57) ABSTRACT

A compression molding machine includes a support mounted for rotation around an axis and a plurality of angularly spaced molds disposed around the support. Each of the molds includes a first mold segment and a second mold segment. At least one of the mold segments is movable with respect to the other mold segment between a closed position for compression molding a plastic article, and an open position for removing a molded article from the mold and placing a mold charge into the mold. An apparatus is provided for placing mold charges into the molds in sequence.

46 Claims, 14 Drawing Sheets

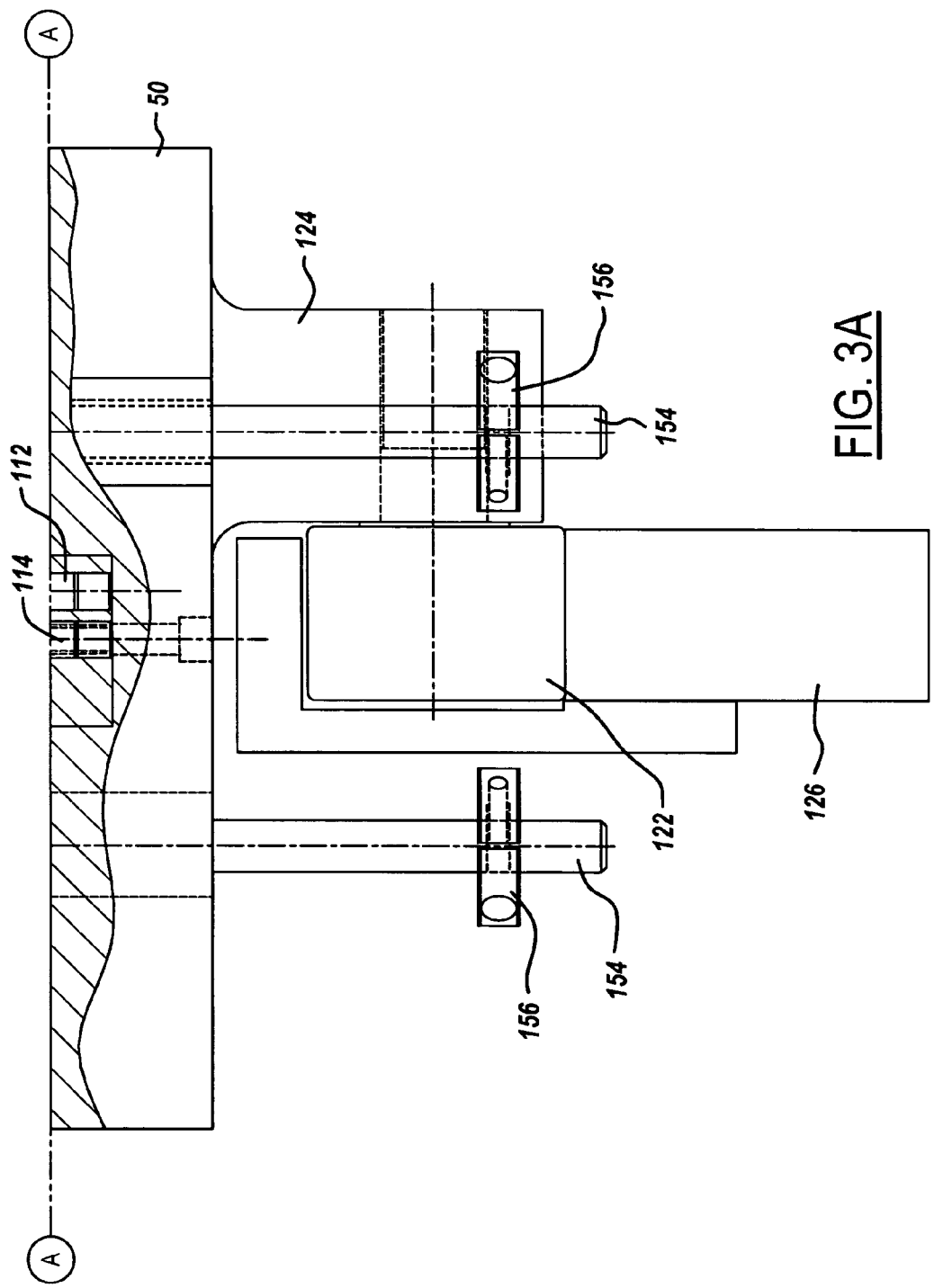

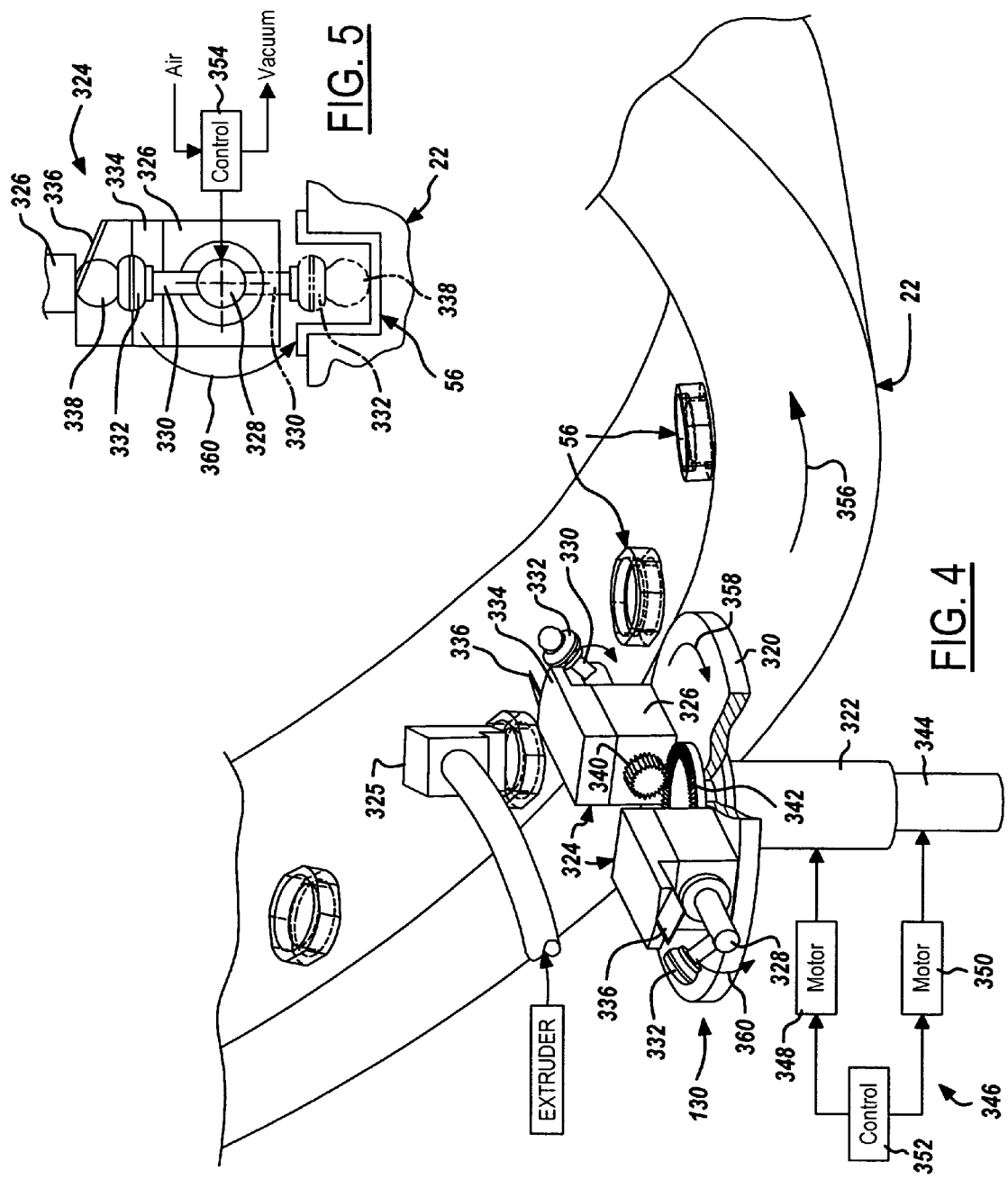

COMPRESSION MOLDING MACHINE

The present disclosure is directed to a machine for molding plastic articles, such as closure shells or sealing liners within closure shells.

BACKGROUND AND SUMMARY OF THE DISCLOSURE

Machines for compression molding closure shells, or compression molding sealing liners within closure shells, typically include a turret or carousel that rotates around a vertical axis. A plurality of molds are provided around the periphery of the carousel, in the form of male and female mold sections that are aligned along vertical axes parallel to the axis of rotation. Cams drive one or both of the mold sections of each pair between an open position, in which a molded part is stripped from the male mold section and a charge of plastic material is placed in the female mold section, and a closed position in which the male and female mold sections are brought together to compression mold the shell or liner. In a liner machine, premade shells are placed in a nest when the mold sections are open, and a charge or pellet of liner material is placed within the shell before the molds are closed. U.S. Patents that illustrate machines of this type for compression molding plastic closure shells include U.S. Pat. Nos. 5,670,100, 5,989,007, 6,074,583 and 6,478,568. U.S. Patents that illustrate machines of this type for compression molding sealing liners within closure shells include U.S. Pat. No. 5,451,360.

Although vertical axis carousel-type machines of the noted type have enjoyed substantial commercial acceptance and success, innovation remains desirable. In particular, in vertical axis carousel-type machines, the mold forces and the weight of the rotating equipment are parallel to the vertical axis of rotation, creating a bending moment with respect to the axis of rotation and the bearings and shaft that support the carousel. Carousel-type machines also require a substantial amount of valuable floor space in a manufacturing facility. It is a general object of the present disclosure, in accordance with one aspect of the disclosure, to provide a method and apparatus for compression molding plastic articles, such as plastic closures and plastic liners within closure shells, which reduce the forces applied to the support frame and bearings, reduce maintenance requirements and the amount of energy needed to operate the machine, and/or reduce the amount of floor space required per machine.

The present disclosure involves a number of aspects that can be implemented separately from or in combination with each other.

A compression molding machine in accordance with a first aspect of the present disclosure includes a support mounted for rotation around an axis and a plurality of angularly spaced molds disposed around the support. Each of the molds includes a first mold segment and a second mold segment. At least one of the mold segments is movable with respect to the other mold segment between a closed position for compression molding a plastic article, and an open position for removing a molded article from the mold and placing a mold charge into the mold. An apparatus is provided for placing mold charges into the molds in sequence.

The apparatus for placing mold charges into compression molds in sequence, in accordance with a further aspect of the present disclosure, includes a plate for rotation around a first axis and at least one mold charge placement mechanism carried adjacent to a periphery of the plate. The mold charge placement mechanism includes a placement arm mounted for rotation around a second axis perpendicular to the first axis, and a cup on an end of the arm for placing mold charges into the compression molds as the molds pass in sequence adjacent to the periphery of the plate. In preferred embodiments in accordance with this aspect of the disclosure, the plate has a circular periphery, and there are a pair of mold charge placement mechanisms at diametrically opposed positions on the plate. A gear is coupled to driven shafts of the mold charge placement mechanisms for rotating the shafts and arms around axes perpendicular to the first axis and coaxial with each other. The gear may be stationary or may itself be rotated by a gear shaft independently of rotation of the plate. A cutter blade severs mold charges from an extruder nozzle or the like as the mechanisms are rotated on the plate. Vacuum and air under pressure preferably are applied selectively to the cups for retaining the mold charges in the cups as the mold charges are transported from the nozzle to the molds, and for assisting separation of the mold charges from the cups into the molds.

A machine for compression molding plastic articles, in accordance with another aspect of the disclosure, includes a first array of compression molds and a second array of compression molds mounted on a support for movement through respective first and second mold paths. Each mold includes mold segments, at least one of which is movable between a closed position and an open position for removing a molded article from the mold and placing a mold charge into the mold. A first mold charge placement apparatus is disposed adjacent to the first path for placing mold charges into molds of the first array in sequence. A second mold charge placement apparatus is disposed adjacent to the second path for placing mold charges into molds of the second array in sequence independently of the first apparatus. Operation of the first and second mold charge placement apparatuses preferably is synchronized to movement of the support. The support preferably includes a wheel mounted for rotation around a horizontal axis, with the first and second arrays of compression molds being disposed on axially opposed sides of the wheel.

BRIEF DESCRIPTION OF THE DRAWINGS

The disclosure, together with additional objects, features, advantages and aspects thereof, will best be understood from the following description, the appended claims and the accompanying drawings, in which:

FIGS. 3A-3D together form a sectional view taken substantially along the line 3-3 in FIG. 2;

FIG. 4 is a fragmentary schematic diagram that illustrates an apparatus for placing mold charges into the compression molds in sequence in accordance with another aspect of the disclosure;

FIG. 5 is a schematic diagram that illustrates operation of the apparatus for FIG. 4;

DETAILED DESCRIPTION OF PREFERRED EMBODIMENTS

The disclosure of U.S. application Ser. No. 11/109,374 filed Apr. 19, 2005 is incorporated herein by reference.

Figure 1:
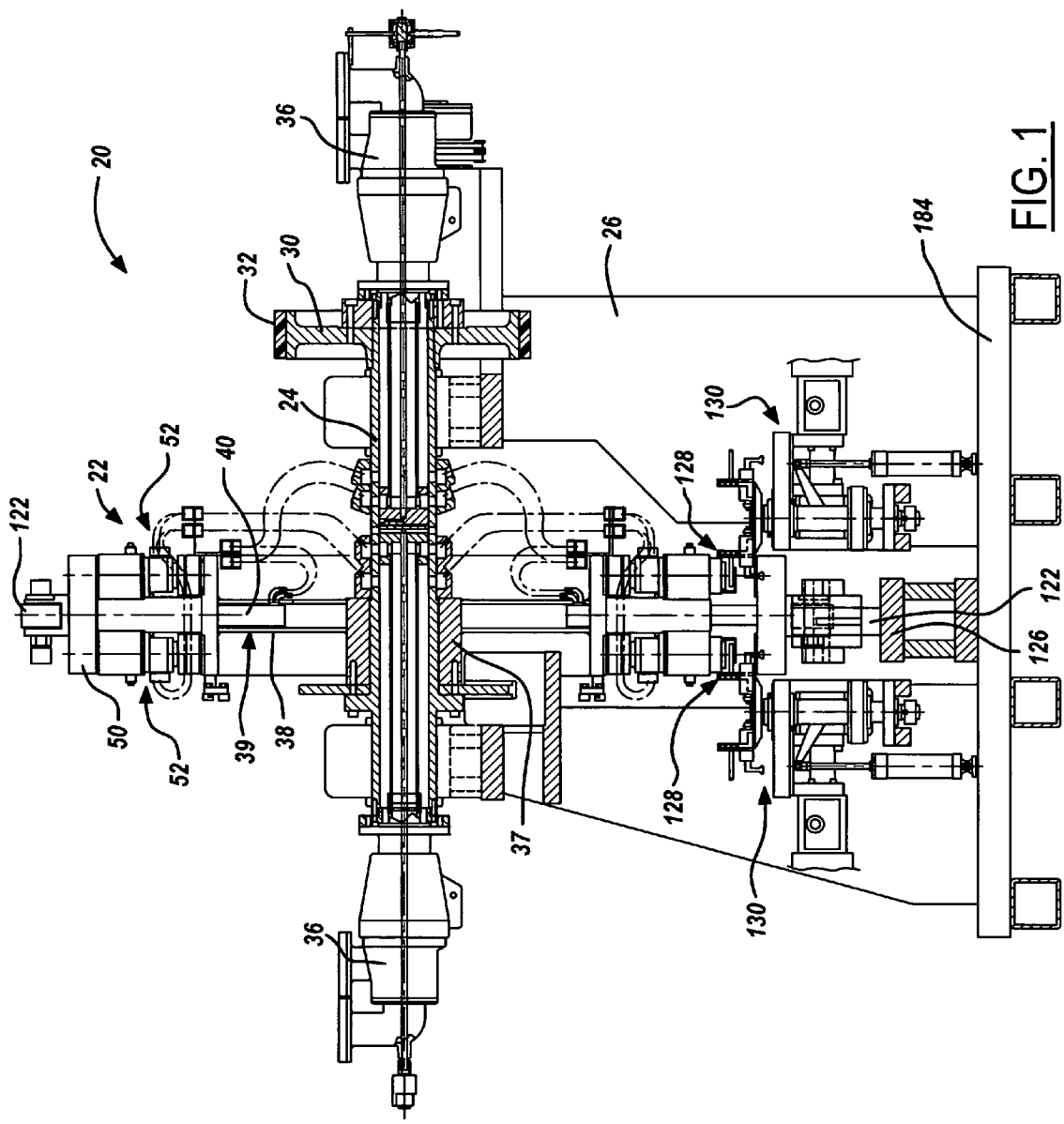
FIG. 1 is a front elevational view of a compression molding machine in accordance with one presently preferred embodiment of the disclosure.
Figure 2:
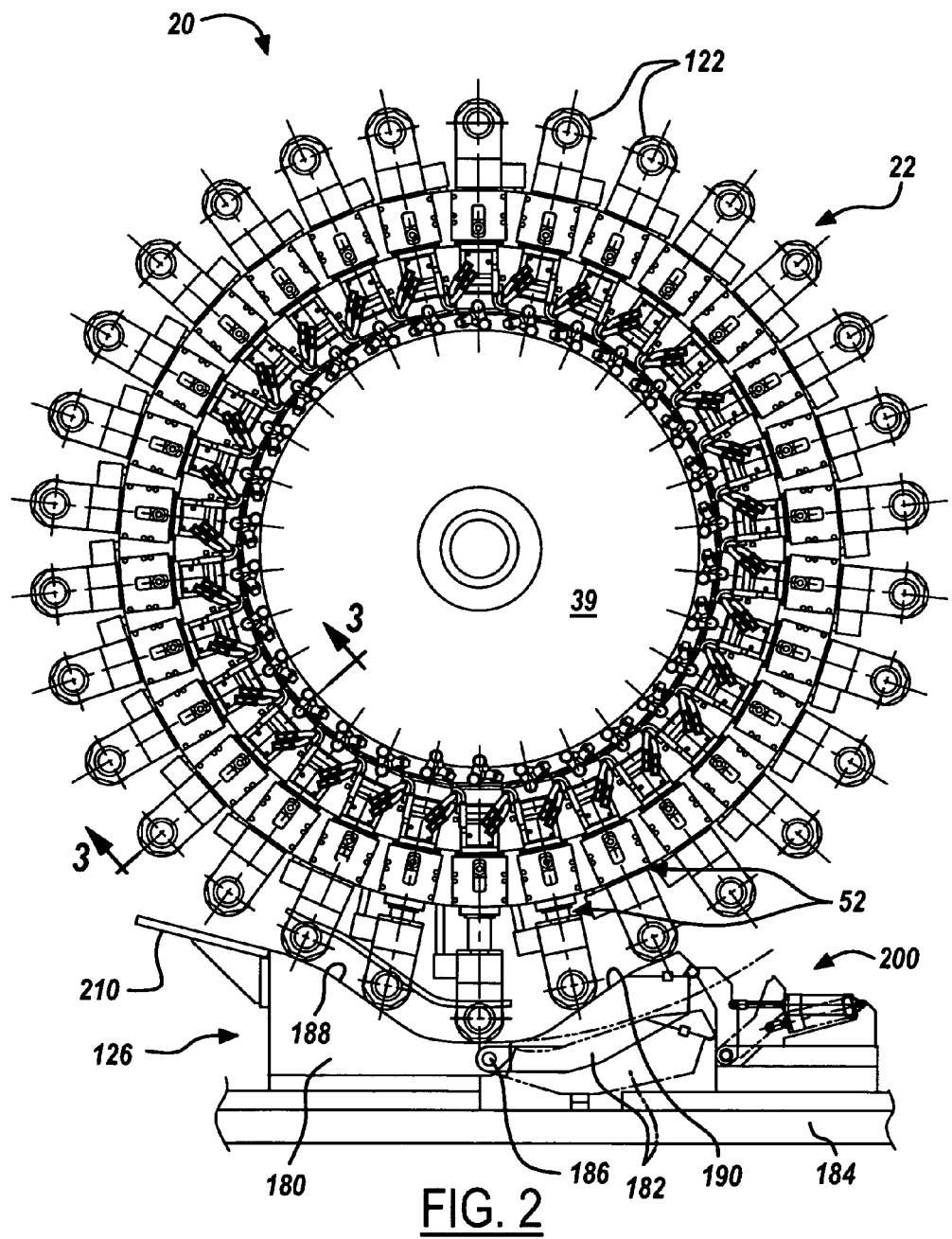
FIG. 2 is a side elevational view of the compression molding machine illustrated in FIG. 1.

FIGS. 1-2 illustrate a machine 20 for compression molding plastic closure shells. Machine 20 includes a wheel 22 mounted on a shaft 24 between spaced supports 26. Shaft 24 is coupled by a pulley 30 and a belt 32 to a motor for rotating shaft 24 and wheel 22 around a horizontal axis. Wheel 22 includes a hub 37 (which may be part of shaft 24) and a support 39 extending radially from hub 37. Support 39 may comprise a disk or the like, or may be in the form of a plurality of angularly spaced radially extending support spokes 38. Each support spoke 38 is hollow at its outer end. A rod 40 is slidably supported by sleeve bearings 42 (FIGS. 3B-3C) within the hollow outer end of each spoke 38. A crossbar 50 is coupled to the end of each rod 40, so that the combination of rod 40 and bar 50 is generally T-shaped as viewed from the tangential direction in FIG. 1. A pair of radially spaced external supports 44, 46 (FIGS. 3B-3C) are provided on each spoke 38. A plurality of angularly spaced molds 52 are disposed around the periphery of wheel 22, preferably on both sides of the wheel. Each mold 52 is disposed between supports 44, 46 on an associated spoke 38 and an end of crossbar 50 on rod 40. All of the molds 52 preferably are identical.

Figure 3B:
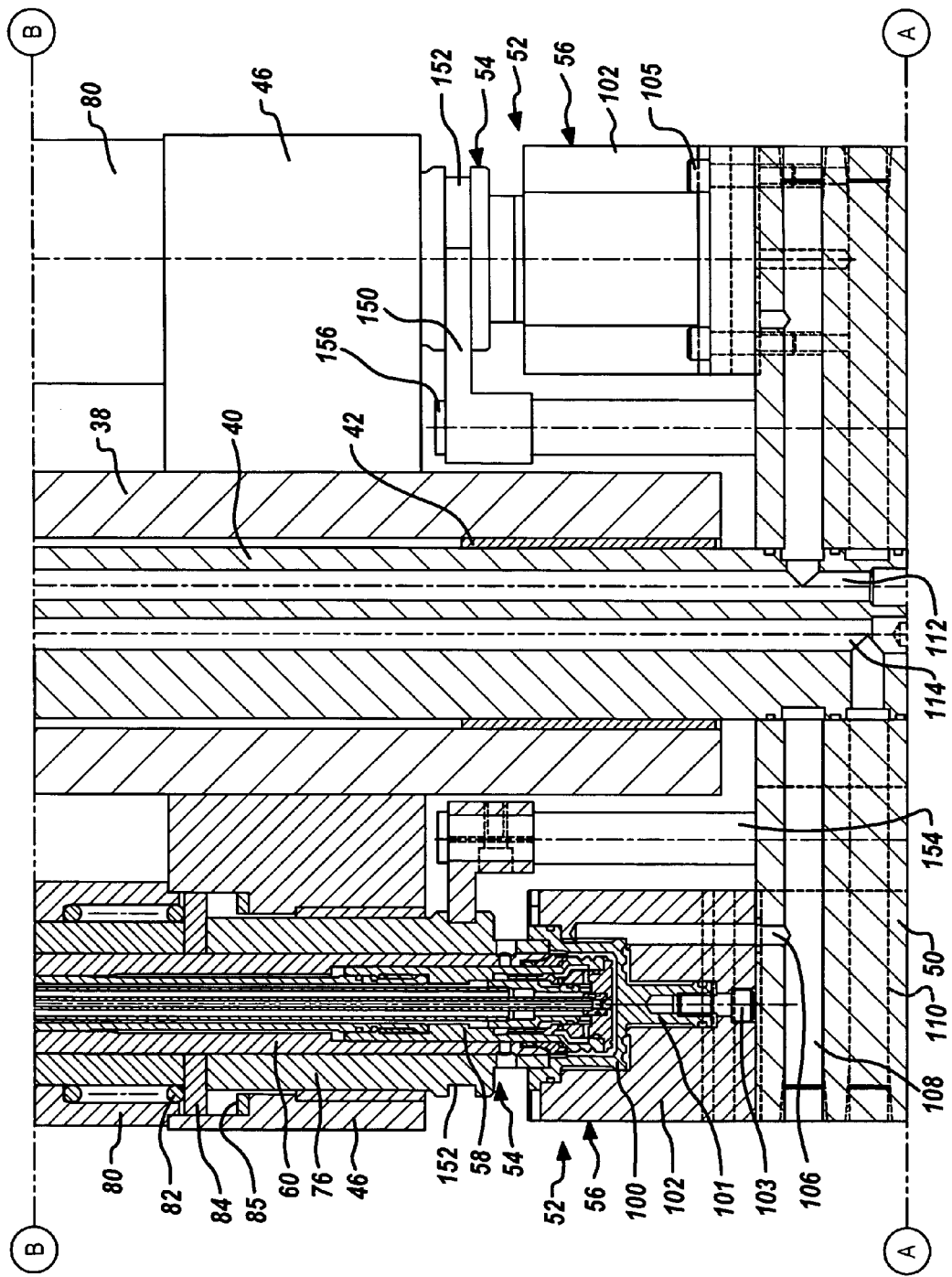
Figure 3C:
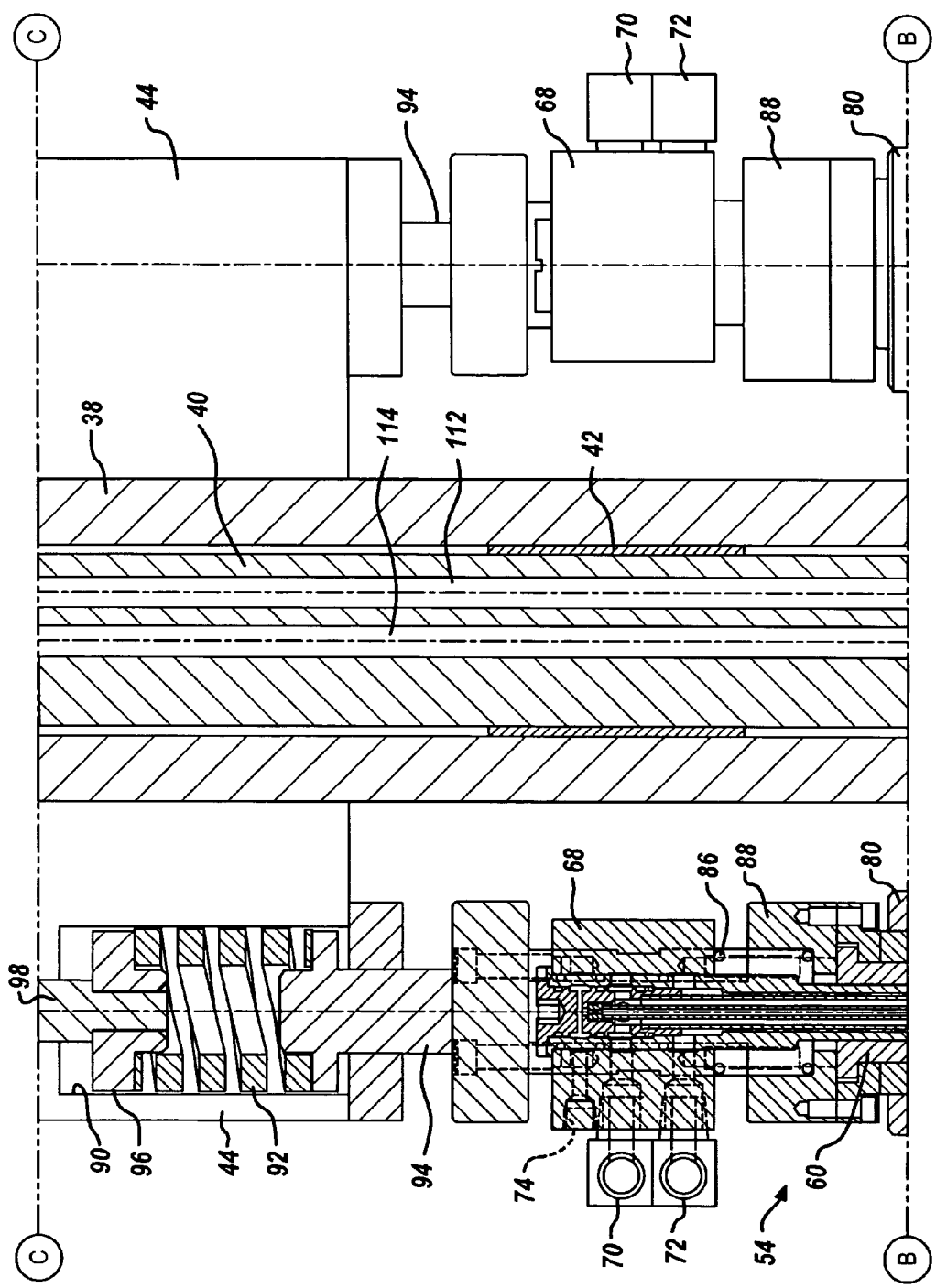

Each mold 52 includes a radially inner first mold section or segment 54 and a second mold section or segment 56 in radially outward alignment with an associated first mold segment 54 (FIGS. 3B-3C). In the illustrated embodiments, the radially inner first mold segment 54 is a male mold segment, and the radially outer second mold segment 56 is a female mold segment, although these mold segments could be reversed in accordance with the broadest principles of the disclosure. First or male mold segment 54 includes a mold core 58 slidably mounted within a surrounding sleeve 60. Mold core 58 has an end or tip 62 contoured for compression molding the inside surfaces of a closure shell in the embodiment of FIGS. 1-3D. A first or outer tube 64 extends coaxially through the hollow interior of mold core 58 forming a first annular passage between the exterior surface of tube 64 and the interior surface of core 58. A second tube or other passage 66 extends through the interior of tube 64, preferably coaxially with tube 64 and core 58, forming a second annular passage between the exterior surface of tube 66 and the interior surface of tube 64. The second annular passage between tubes 64, 66 is coupled at a manifold block 68 to a coolant inlet fitting 70. Likewise, the first annular passage between tube 64 and core 58 is coupled at manifold block 68 to a coolant outlet fitting 72. (The "inlet" and "outlet" functions can be reversed.) Thus, coolant can be fed from fitting 70 through the second passage between tubes 64,66 to the tip 62 of core 58, and thence through the first passage between tube 64 and core 58 to outlet fitting 72. An inlet 74 on manifold block 68 is coupled to the interior of tube 66, and can be connected to a source of compressed air for example to assist stripping of closure shells from core tip 62. Manifold block 68 preferably is mounted on the radially inner end of mold core 58—i.e., the end opposite from core tip 62.

A stripper sleeve 76 (FIG. 3B) surrounds sleeve 60 and is slidably supported by a bearing 78 within support 46. A cap 80 is secured to support 46, and a coil spring 82 is captured in compression between cap 80 and a washer 84 slidably disposed within support 46 in abutment with the inner end of stripper sleeve 76. Thus, spring 82 biases stripper sleeve 76 toward the second or female mold segment 56 of each mold 52. When the mold is open, washer 84 abuts a surface 85 within support 46 to limit outward movement of stripper sleeve 76 over core 58. A second coil spring 86 (FIG. 3C) is captured in compression between manifold block 68 and an abutment 88 coupled to the end of sleeve 60. Thus, core 58 is biased by spring 86 inwardly against sleeve 60. Each support 44 (FIG. 3C) has an interior pocket 90 that opens radially outwardly toward and in alignment with the associated first mold segment 54. A coil spring 92 is captured in compression within each pocket 90 and engages an extension 94 coupled to an abutment 88 on sleeve 60. Thus, as pressure to form the closure shell or liner pushes on core 56, core 56 pushes against sleeve 60, which pushes against spring 92 to maintain forming pressure on the melt. (Coil springs 92 can be replaced by fluid springs.) Within pocket 90, spring 92 engages a plate 96 that is coupled to an adjustment screw 98 for individually adjusting the force applied by each spring 92.

Figure 3D:
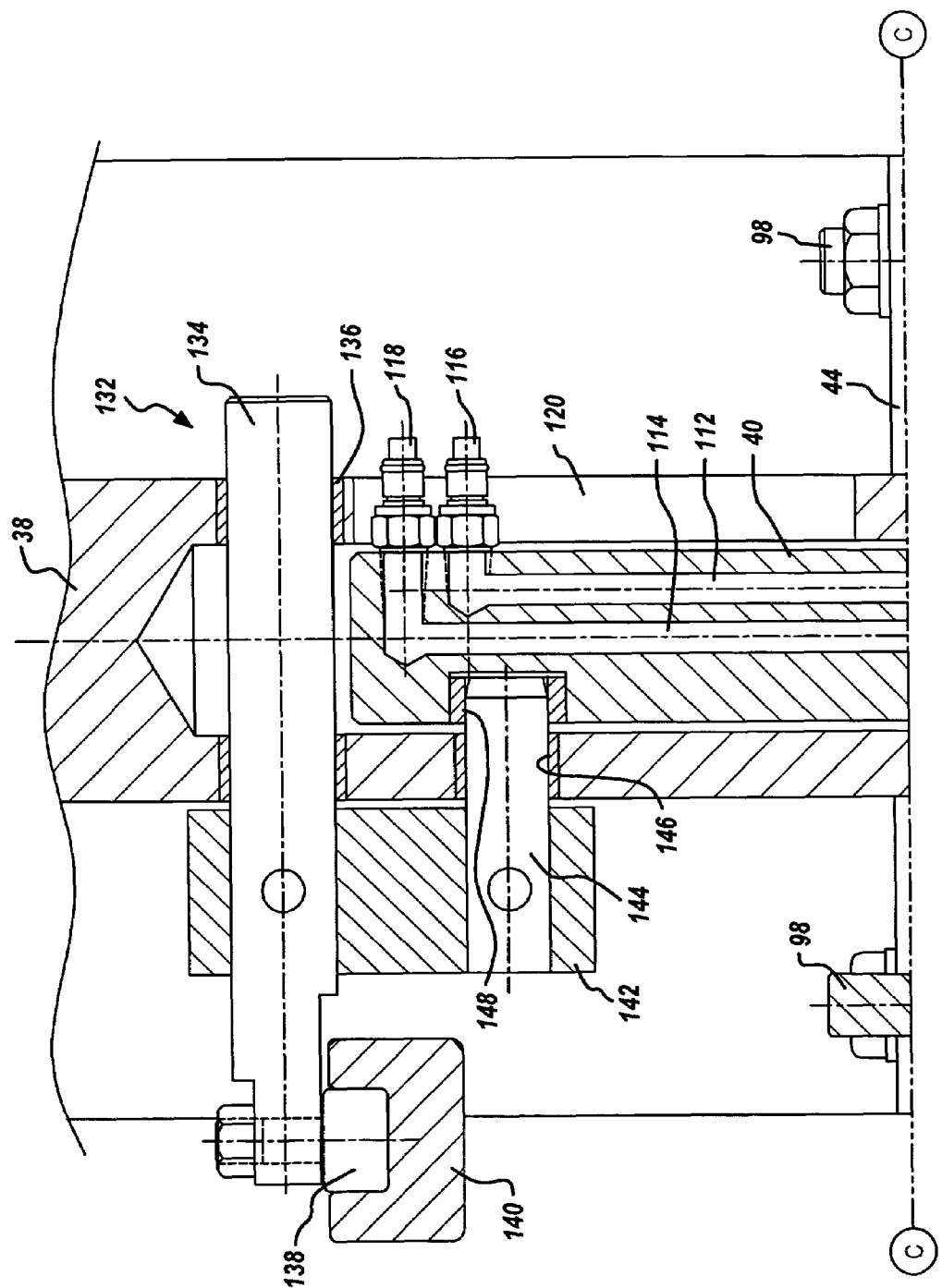

Second or female mold segment 56 (FIG. 3B) preferably includes a cavity-forming insert 100 having an extension 101 that receives a screw 103 removably to mount the insert on a support block 102. Blocks 102 are removably mounted on crossbar 50 by screws 105 (FIG. 3B). Block 102 has coolant passages 106 that communicate in the illustrated embodiment with lateral passages 108,110 in crossbar 50, and thence to longitudinal radial passages 112,114 in rod 40. As best seen in FIG. 3D, passages 112,114 in rod 40 are connected to fittings 116,118 for circulation of coolant through rod 40, crossbar 50 and block 102 to cool mold cavity inserts 100. It will be noted in FIG. 3D that fittings 116,118 extend through a slot 120 in spoke 38 to permit radial movement of rod 40 with respect to spoke 38.

A cam follower roller 122 (FIGS. 1, 2 and 3A) is rotatably mounted on a leg 124 that extends radially outwardly from crossbar 50. (Directional words such as "radially," "laterally," "outwardly," "inwardly" and "tangentially" are employed by way of description and not limitation with respect to the horizontal axis of rotation of the wheel.) Leg 124 is offset from the axis of rod 40 on which crossbar 50 is mounted so that cam follower roller 122 is aligned with the axis of rod 40. Each cam follower roller 122 on each crossbar 50 thus is associated, in the illustrated exemplary embodiment, with two molds 52 located on opposite sides of wheel 22. A cam 126 preferably is disposed along the lower arc of the periphery of wheel 22, as best seen in FIG. 2, for engaging cam follower rollers 122 in sequence as wheel 22 rotates around its horizontal axis. During counterclockwise rotation of wheel 22, in the orientation of FIG. 2, follower rollers 122 of each pair of molds 52 in sequence are engaged and captured by cam 126 to pull second mold segments 56 outwardly and downwardly away from first mold segments 54. When each mold in turn is fully open, molded parts or articles are removed from the mold cavities by a suitable part removal mechanism 128 (FIG. 1). A new mold charge is then placed within each mold cavity by a suitable charge placement apparatus 130. As wheel 22 continues rotation, second mold segments 56 in sequence are moved upwardly and inwardly to their closed positions with respect to first mold segments 54 by the counterclockwise end of cam 126, again in the orientation of FIG. 2. Each spoke 38 preferably carries a latch 132 for locking the mold sections to each other in the fully closed position so that there is no need for cam 126 to extend entirely around the periphery of wheel 22.

The foregoing disclosure in connection with FIGS. 1-3D, and particularly FIGS. 2-3D, is provided by way of an exemplary environment for disclosure of mold charge placement apparatus 130 and molded part removal apparatus 128 (FIG. 1).

FIGS. 4-8 illustrate a mold charge placement apparatus 130 (FIG. 1) in accordance with an aspect of the present disclosure. Mold charge placement apparatus 130 in FIGS. 4-8 includes a plate 320, preferably circular, coupled to a collar 322 for rotation around a first axis coaxial with plate 320 and collar 322. This axis of rotation preferably is a vertical axis in one preferred implementation in combination with a mold wheel 22 that rotates around a horizontal axis. It will be recognized that wheel 22 and mold sections 56 carried thereby are illustrated only schematically in FIGS. 4-8. It will be noted that mold charge placement apparatus 130 can be used equally as well in combination with a vertical axis carousel-type compression molding machine, in which the mold cavities 56 are presented horizontally in sequence adjacent to the periphery of plate 320. Placement apparatus 130 can be used for placing mold charges for compression molding closure shells or for compression molding liners in premade shells.

At least one mold charge cutter and placement mechanism 324 is disposed at the periphery of wheel 320 for severing mold charges from an extruder nozzle 325, transporting the mold charges to mold sections 56 in sequence and placing the mold charges into the mold sections. In the illustrated embodiment, there are a pair of mold charge cutting and placement mechanisms 324 positioned on diametrically opposite sides of plate 320. A greater number of mechanisms 324 can be placed around plate 320, preferably at equal angular increments. Mechanisms 324 preferably are identical in construction. Each mechanism 324 preferably includes a bearing block 326 mounted adjacent to the periphery of plate 320, and a driven shaft 328 that extends through bearing block 326 for rotation around a second axis perpendicular to the axis of rotation of plate 320. The axes of rotation of driven shafts 328 preferably are colinear. An arm 330 extends from the end of each shaft 328 at an angle to the axis of shaft rotation, preferably perpendicular to the axis of shaft rotation. A radially outwardly opening hollow cup 332 is mounted at the end of each arm 330. Thus, each cup 332 rotates around the axis of shaft 328, and shafts 328 are rotated around the axis of plate 320. A knife block 334 is mounted on each bearing block 332 in this embodiment. A cutter blade or knife 336 extends from each block 334 over shaft 328 and at an angle to the axis of shaft 328. Cutter blades 336 passed in sequence beneath the outlet of nozzle 325 to sever a mold charge 338 from nozzle 325 as the associated cup 332 is positioned beneath the nozzle. Nozzle 325 is positioned above the periphery of plate 320 in this embodiment.

The inner end of each shaft 328 is coupled to a gear 340. Gears 340 in turn are coupled to a gear 342 that is mounted on the end of a gear shaft 344 that extends through plate 320 and collar 322, preferably coaxially with the collar and plate. Thus, rotation of gear shaft 344 is imparted by gears 340, 342 to driven shafts 328, arms 330 and cups 332. Collar 322 and gear shaft 344 are coupled to suitable means 346 for controlling rotation of the collar and gear shaft around the first axis. These control means 346 are illustrated in FIG. 4 as comprising a first motor 348 coupled to collar 322 and a second motor 350 coupled to gear shaft 344. Motors 348, 350 are connected to a suitable control 352 for rotating collar 322 and plate 320, and gear shaft 344 and cups 322, in synchronism, but preferably independently of each other in this embodiment. Motors 348,350 may comprise independently controllable servo motors. As an alternative, gear shaft 344 and collar 322 could be coupled by suitable gears, pulleys and the like to the drive motor for rotating wheel 22.

In operation, mold charges 338 of suitable resin material are severed from nozzle 325 by cutter blades 336 as mechanisms 324 pass in turn beneath nozzle 325. As a mold charge 338 is severed, arm 330 and cup 332 preferably are oriented vertically upwardly (schematically in FIG. 5) to receive the severed mold charge. Continued rotation of shaft 328, arm 330 and cup 332 in the direction 360 (from the position shown in solid lines in FIG. 5, through the positions of FIGS. 4 and 6, to the position of FIG. 7 and in phantom in FIG. 5) transports mold charge 338 to a downwardly oriented position, at which point cup 332 and mold charge 338 are disposed within a mold section 56 for placing the mold charge. Surface tension between molten charge 338, cup 332 and mold section 56 can be used to hold and transfer the mold charge. However, capture, transport and release of the mold charge more preferably are assisted by a control 354 (FIG. 5) coupled to each cup 332 through the associated shaft 328 and arm 330. Control 354 selectively applies vacuum to cup 332 for capturing and holding severed mold charge 338 within the cup until the cup is disposed within a mold section 56, and selectively applies air under pressure through shaft 328, arm 330 and cup 332 to assist release and placement of mold charge 338 within mold section 56. Thus, each mold charge 338 is placed affirmatively within a mold section 56, so that placement of the mold charge is controlled to enhance flow of material during the compression molding operation. This controlled charge placement may be contrasted with prior art techniques, which typically involve free-fall of the mold charge into the mold section, sometimes assisted by air pressure and/or vertical acceleration of the placement mechanism at the time of release, which can result in non-ideal placement of the mold charge in the mold section and non-uniform flow of material during compression molding.

Figure 6:
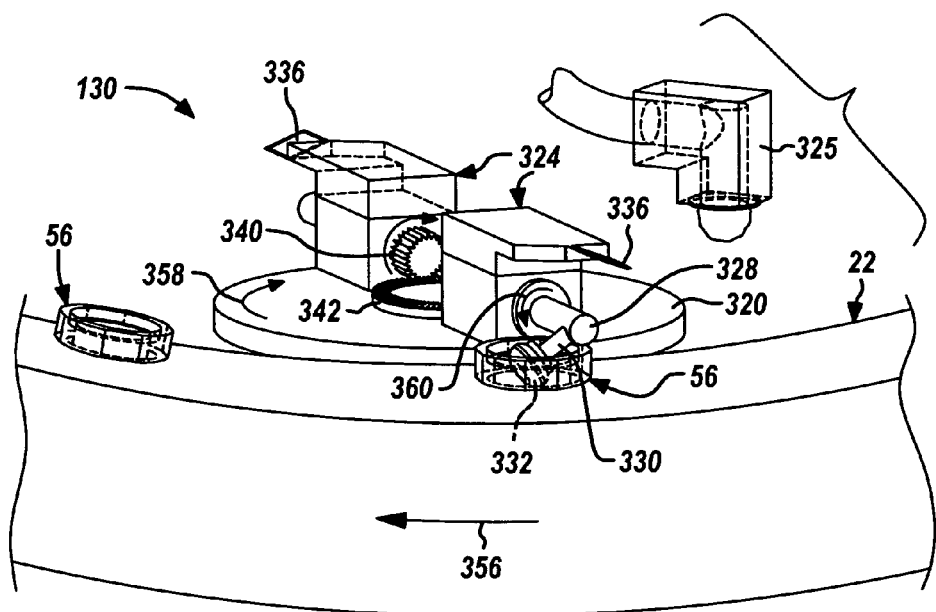
FIGS. 6, 7 and 8 are schematic diagrams that illustrate sequential stages of operation of the placement apparatus of FIG. 4.
Figure 7:
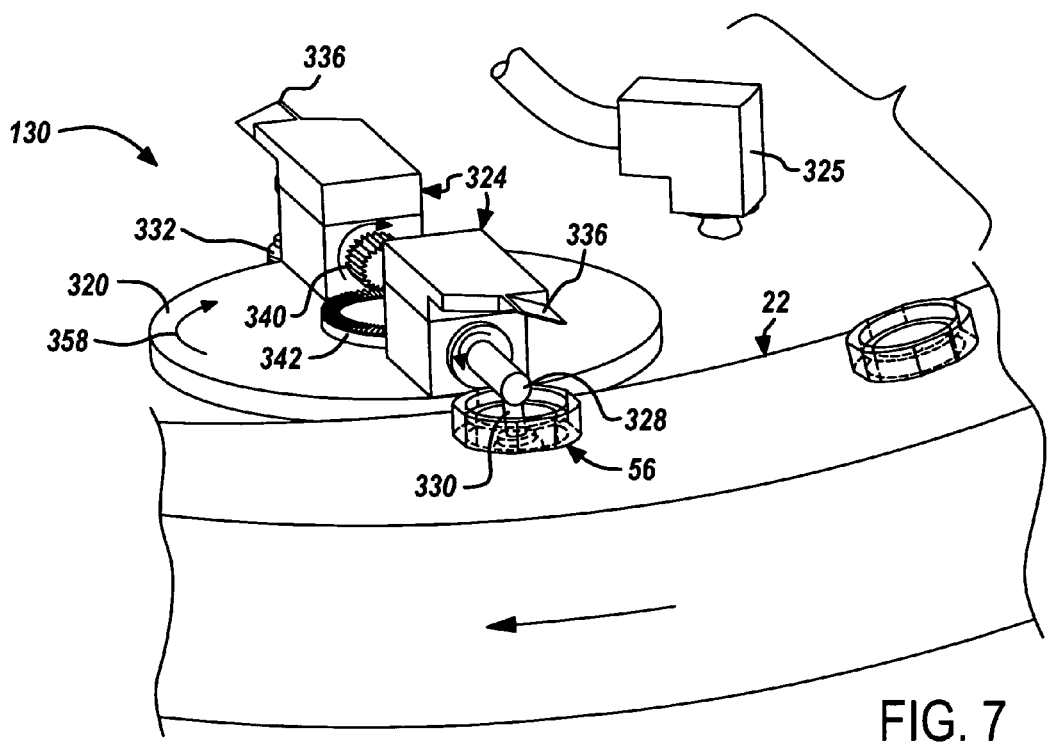
Figure 8:
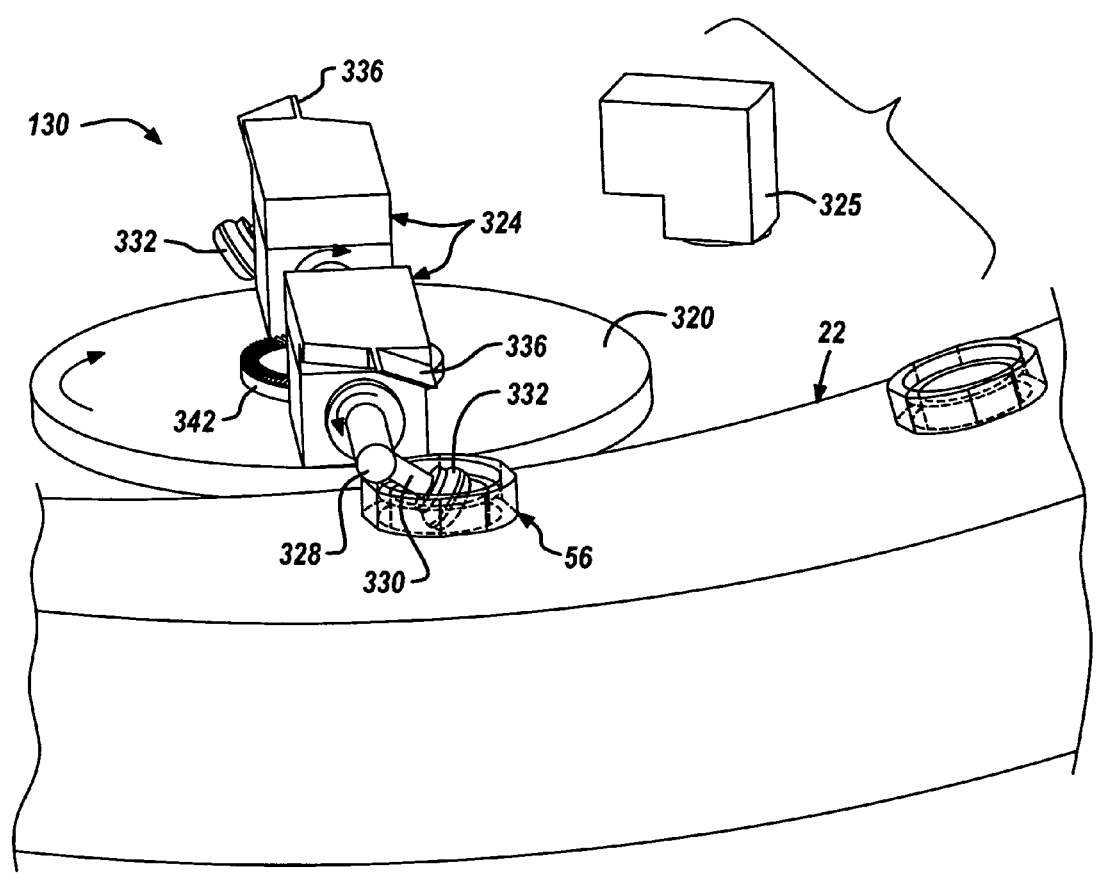

FIG. 6 illustrates initial entry of mold charge placement arm 330 and cup 332 into a mold section 56 as wheel 22 rotates in the direction 356, plate 320 rotates in the direction 358 and shaft 328 rotates in the direction 360. Further rotation of wheel 22, shaft 328 and plate 320 bring arm 330 to the vertical orientation illustrated in FIGS. 5 and 7, at which point the mold charge is released into the mold section. Further rotation begins to remove arm 330 and cup 332 from section 56, as illustrated in FIG. 8. It will be noted that the speed of rotation of plate 358 is such that arm 330 and cup 332 are removed from mold section 56 while wheel 22 continuously rotates, and without interference of the arm and cup with the edges of cavity 56. Plate 320 preferably rotates in the direction 358 at constant angular velocity, and shafts 328, arms 330 and cups 332 preferably rotate in the direction 360 at constant angular velocity. Wheel 22 preferably rotates in the direction 356 at constant angular velocity. It will be noted in FIG. 4 that, when one of the cups 332 is in a charge placement position in a mold section 56, the cup 332 on the opposing side of plate 320 also is in a downward orientation. Thus, during machine start-up, charge 338 can be retained in cup 332 rather than placed in mold section 56, and then ejected for scrap or recycle on the opposing side of plate 320.

FIGS. 9-12 illustrate another exemplary mold charge placement apparatus 130 (FIG. 2) in accordance with the present disclosure. Reference numerals in FIGS. 9-12 that are identical to those in FIGS. 14-18 illustrate identical or related components. The discussion of FIGS. 9-12 will be directed primarily to the differences between the embodiment of FIGS. 9-12 and that of FIGS. 4-8.

Figure 9:
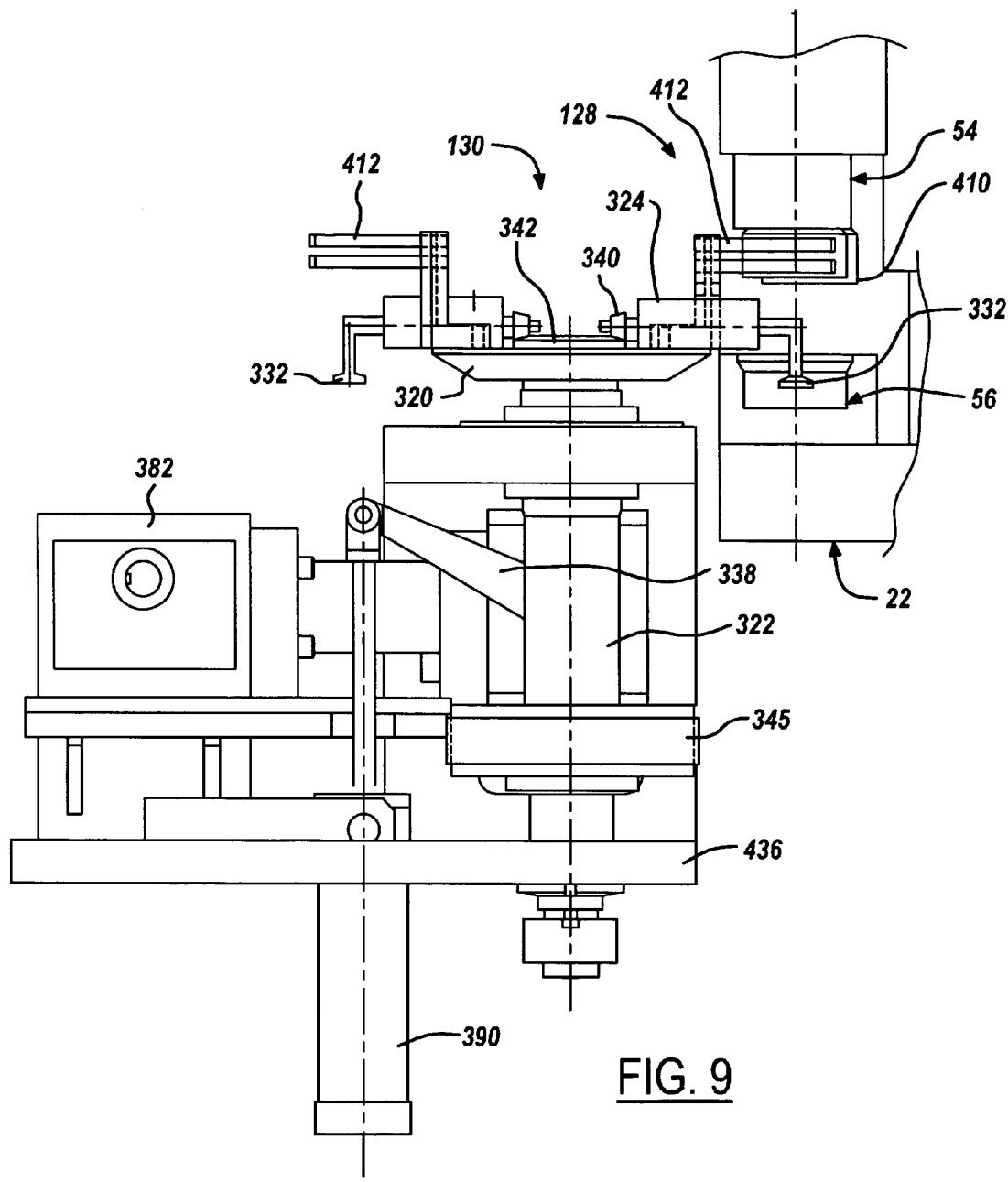
FIG. 9 is a fragmentary elevational view on an enlarged scale of the mold charge placement apparatus of FIG. 1 in accordance with another aspect of the disclosure.
Figure 10:
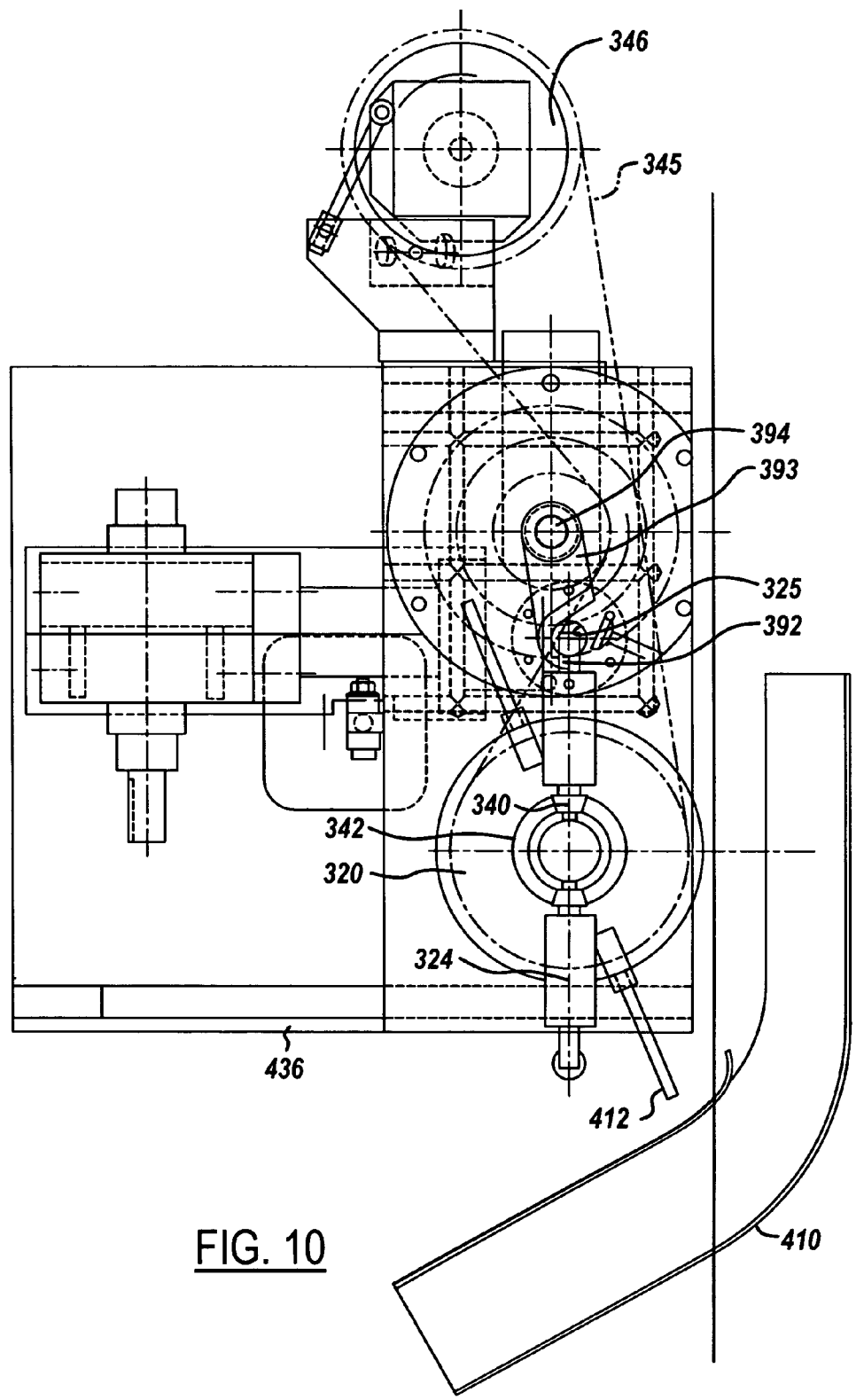
FIG. 10 is a top plan view of the apparatus of FIG. 9.
Figure 11:
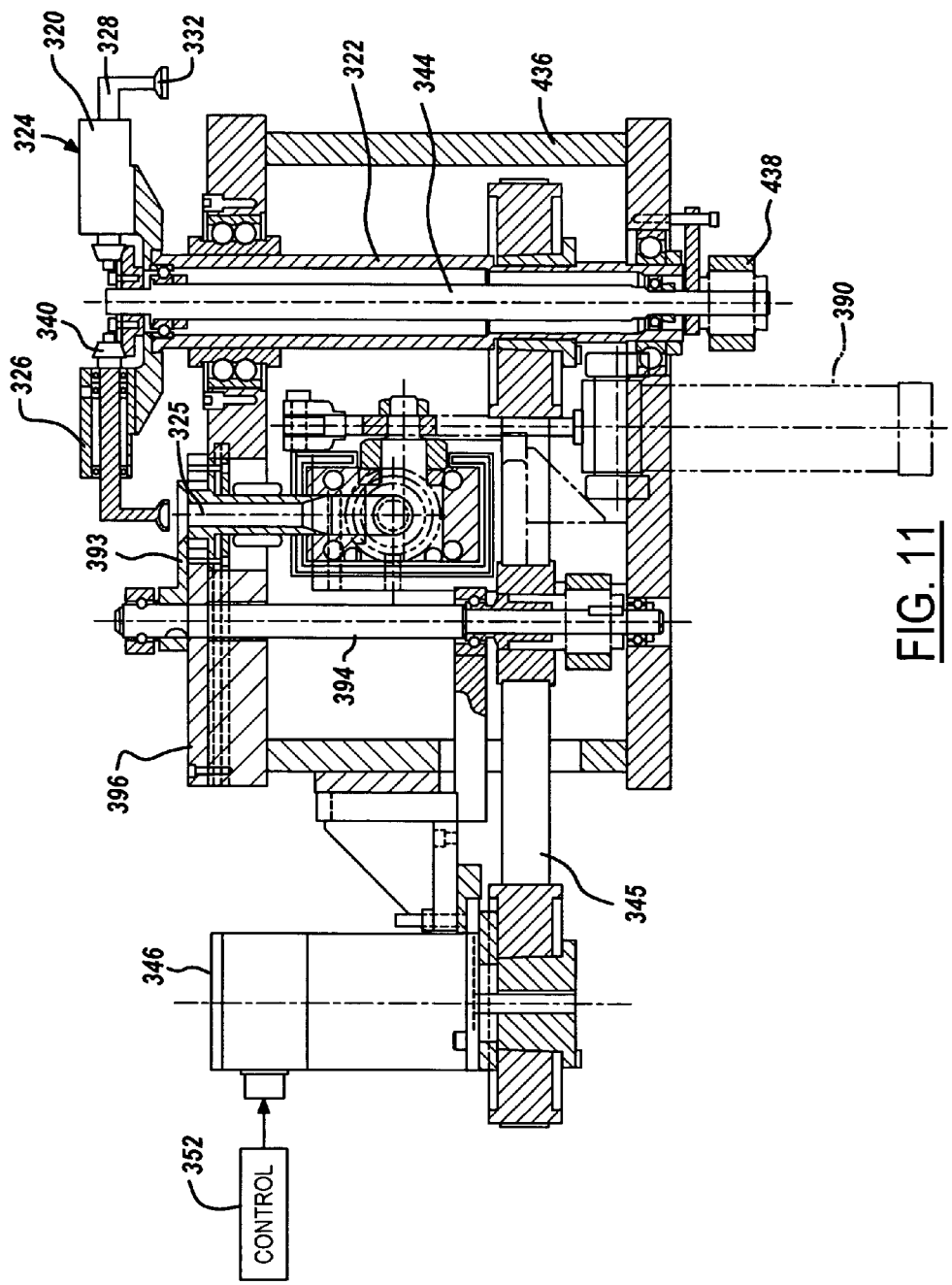
FIGS. 11 and 12 are sectional views of the apparatus of FIGS. 9 and 10.
Figure 12:
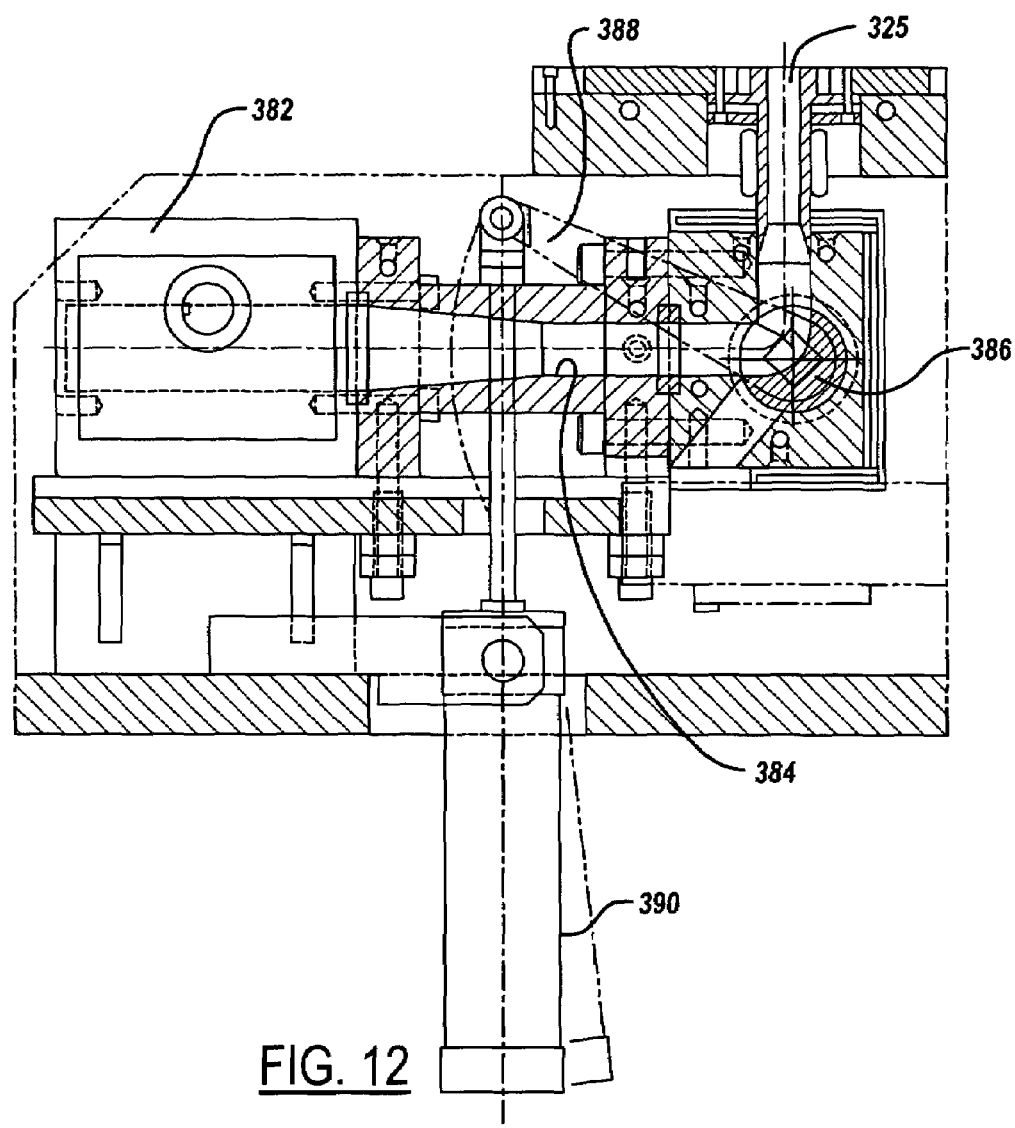

In the embodiment of FIGS. 9-12, extruder nozzle 325 is parallel to but laterally offset from the axis of sleeve 322 and gear shaft 344, and is positioned beneath mechanisms 326 and plate 320 rather than above the mechanisms and plate as in the embodiment of FIGS. 4-8. A pellet cutter knife 392 is coupled by an arm 393 to a blade shaft 394 for rotation along a plate 396 over the outlet of nozzle 325. The axis of shaft 394 is parallel to but laterally spaced from the axis of sleeve 322 and shaft 344 (FIG. 11). Collar 322 and shaft 394 are coupled by a belt 345 to motor 346. Shaft 344 is stationary—i.e., is not motor driven—in this embodiment. Shaft 344 is coupled to frame 436 by a phase adjuster 438 (FIG. 11) for adjusting the "timing" of shaft 344 and gear 342 relative to collar 322 and plate 320. Thus, shaft 344 and gear 342 are stationary in this embodiment during normal operation of the apparatus—i.e., after initial phasing adjustment by means of phase adjuster 438. Motor 346 is connected to a suitable control 352 for rotating collar 322 and plate 320, and rotating drive shaft 394 and blade 392, in synchronism with wheel 22. Motor 346 may comprise an independently controllable servo motor. As an alternative, collar 322 and shaft 394 could be coupled by suitable gears, pulleys or the like to wheel 22 (FIGS. 1 and 2). Hot melt from an extruder may be fed to nozzle 325 by a metering pump 382 (FIG. 7), a passage 384 and a diverter gate 386. Diverter gate 386 is coupled by an arm 388 to a cylinder or actuator 390.

In operation, mold charges of suitable resin material are severed from nozzle 325 by cutter knife 392 as mechanisms 324 pass in turn over nozzle 325. As the mold charge is severed, an arm 330 and a cup 332 preferably are oriented vertically downwardly to receive the severed mold charge. Continued rotation of plate 320, shaft 328, arm 330 and cup 332 transports the mold charge to a downwardly oriented position at which cup 332 and mold charge 338 are disposed within a mold section 56 for placing the mold charge. Surface tension between the molten charge and cup 332 and the mold section can be used to hold and transfer the mold charge. However, capture, transport and release of the mold charge more preferably are assisted by a control 354 (FIG. 5) coupled to each cup 332 through the associated shaft 328 and arm 330. Control 354 selectively applies vacuum to cup 332 for capturing and holding severed the mold charge within the cup until the cup is disposed within a mold section 56 (FIG. 9), and selectively applies air under pressure through shaft 328, arm 330 and cup 332 to assist release and placement of the mold charge within mold section 56. Thus, each mold charge is placed affirmatively within a mold section 56, so that placement of the mold charge is controlled to enhance flow of material during the compression molding operation.

FIGS. 1, 9 and 10 also illustrate an example of molded part removal apparatus 128. A chute 410 is positioned beneath mold segment 54 in the open position of the mold. Stripper sleeve 76 (FIG. 3B) strips molded closure shells from the male mold core onto chute 410. One or more fingers 412 are carried by plate 320 of the mold charge placement mechanism to engage the molded closure shell on chute 410 and push the shell along the chute.

Figure 13:
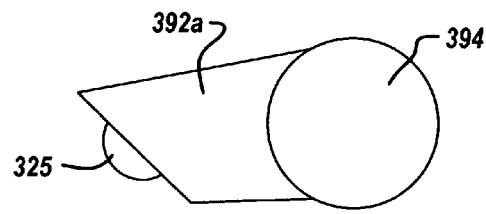
FIGS. 13 and 14 are top plan views of pellet cutter knives that can be used in the embodiments of FIGS. 10-12.
Figure 14:
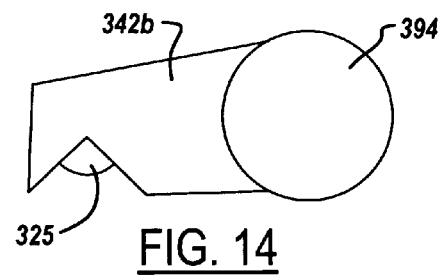

FIG. 13 illustrates a cutter blade 392a that has an angulated straight cutting edge, rather than the arcuate cutting edge of the blade 392 in FIG. 10. FIG. 14 illustrates a cutter blade 392b that has a V-shaped cutting edge, which may help prevent lateral movement of the mold charge in some applications.

Figure 16:
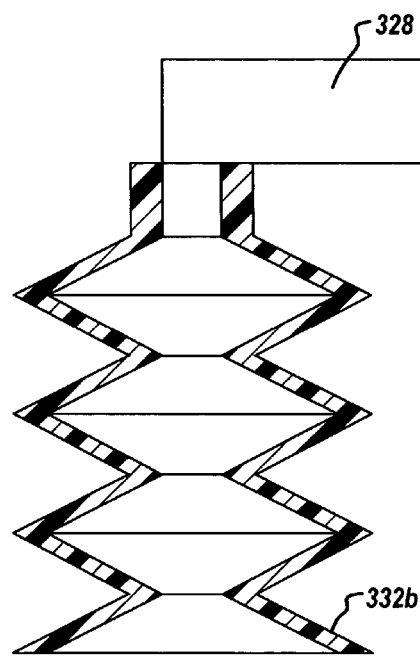
FIGS. 15 and 16 are side elevational views of pick-up cups that can be used in the embodiments of FIGS. 4-8 and 9-12.
Figure 15:
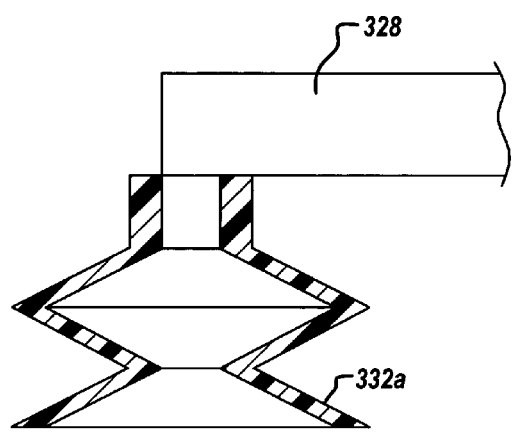

FIGS. 15 and 16 illustrate pick-up cups 332a, 332b as modifications to the cup 332 in the embodiments of FIGS. 4-8 and 9-12. Whereas cups 332 are of relatively rigid construction, cups 332a and 332b are flexible bellows-shaped constructions of flexible resilient material, such as plastic, preferably silicone, for example.

There thus have been disclosed a machine and method for compression molding plastic articles, which fully satisfy all of the objects and aims previously set forth. The disclosure has been presented in conjunction with several presently preferred embodiments, and a number of additional modifications and variations have been discussed. Other modifications and variations readily will suggest themselves to persons of ordinary skill in the art. The disclosure is intended to embrace all such modifications and variations as fall within the spirit and broad scope of the appended claims.

The invention claimed is:

1. A compression molding machine that includes:
    a wheel mounted for rotation around an axis and a plurality of angularly spaced molds disposed around said wheel,
    each of said molds including a first mold segment and a second mold segment,
    at least one of said mold segments being movable with respect to the other mold segment between a closed position for compression molding a plastic article and an open position for removing a molded article from said mold and placing a mold charge into said mold, and
    an apparatus for placing mold charges into said molds in sequence, which includes:
    a plate for rotation around a first axis and a mold charge placement mechanism carried adjacent to a periphery of said plate,
    said mold charge placement mechanism including a placement arm mounted for rotation around a second axis perpendicular to said first axis and a cup at an end of said arm for placing mold charges into said molds as said molds pass in sequence adjacent to said periphery of said plate.

2. The machine set forth in claim 1 wherein said mold charge placement mechanism includes a driven shaft for rotation around said second axis, with said arm extending from said driven shaft at an angle to said second axis.

3. The machine set forth in claim 2 wherein said arm is perpendicular to said second axis.

4. The machine set forth in claim 2 including a cutter blade for cutting mold charges from a nozzle, said cup receiving mold charges cut by said blade and carrying the mold charges for placement into the molds.

5. The machine set forth in claim 4 wherein said cutter blade is carried by said mold charge placement mechanism.

6. The machine set forth in claim 4 wherein said nozzle is spaced from said first axis, and wherein said cutter blade is on an arm coupled to a blade shaft for rotation around a third axis parallel to said first axis.

7. The machine set forth in claim 6 including a motor coupled to said blade shaft and to said plate for rotating said cutter blade and said plate simultaneously.

8. The machine set forth in claim 4 including a control for selectively applying vacuum to said cup to retain the mold charge in said cup.

9. The machine set forth in claim 8 wherein said control also selectively applies air under pressure to said cup to assist placement of the mold charge into a mold.

10. The machine set forth in claim 4 including a collar coupled to said plate, a gear shaft extending through said collar and said plate, and gears coupling said gear shaft to said driven shaft.

11. The machine set forth in claim 10 wherein said gear shaft is stationary.

12. The machine set forth in claim 10 including mold charge placement mechanisms diametrically spaced from each other adjacent to a periphery of said plate, both of said placement mechanisms including driven shafts coupled by gears to said gear shaft.

13. A machine for compression molding plastic articles, which includes:
   a wheel mounted for rotation around a horizontal axis,
   a plurality of angularly spaced molds, each including a radially outwardly oriented first mold segment and a radially inwardly oriented second mold segment disposed in radially outward alignment with an associated first mold segment,
   a cam disposed adjacent to said wheel to engage each of said second mold segments in sequence as said wheel rotates to move said second mold segment radially outwardly to an open position with respect to the associated first mold segment for removing a molded article and placing a mold charge into the mold, and a radially inward closed position with the first mold segment to compression mold an article between said mold segment, and
   an apparatus for placing mold charges into said molds in sequence, which includes:
   a circular plate for rotation around a first axis and having a periphery adjacent to a path of travel of compression molds in sequence,
   a pair of mold charge placement mechanisms angularly spaced from each other around said periphery of said plate, and
   a cutter blade for severing mold charges from a nozzle as said cutter blade passes across the nozzle,
   each of said mold charge placement mechanisms including a driven shaft for rotation around a second axis perpendicular to said first axis, an arm extending from said driven shaft at an angle to said second axis and a cup at an end of said arm,
   said cup receiving mold charges severed by said blade, transporting the mold charges and placing the mold charges into molds as the molds pass in sequence adjacent to the periphery of said plate.

14. The machine set forth in claim 13 including a control for selectively applying vacuum to said cups to retain the mold charges in said cups.

15. The machine set forth in claim 14 wherein said control also selectively applies air under pressure to said cups to assist placement of the mold charges into said molds.

16. The machine set forth in claim 13 including a collar coupled to said plate, a gear shaft extending through said collar and said plate, and gears coupling said gear shaft to the driven shafts of said mold charge placement mechanisms.

17. The machine set forth in claim 16 wherein said pair of mold charge placement mechanisms are diametrically spaced from each other adjacent to a periphery of said plate, both of said placement mechanisms including driven shafts coupled by gears to said gear shaft.

18. The machine set forth in claim 16 wherein said gear shaft is stationary.

19. The machine set forth in claim 16 wherein said cutter blade is carried by said mold charge placement mechanism.

20. The machine set forth in claim 16 wherein said nozzle is spaced from said first axis, and wherein said cutter blade is coupled by an arm to a blade shaft for rotation around a third axis parallel to said first axis.

21. The machine set forth in claim 20 including a motor coupled to said blade shaft and to said plate for rotating said cutter blade and said plate simultaneously.

22. Apparatus for placing mold charges into compression molds in sequence, which includes:
   a plate for rotation around a first axis and at least one mold charge placement mechanism carried adjacent to a periphery of said plate,
   said mold charge placement mechanism including a placement arm mounted for rotation around a second axis perpendicular to said first axis and a cup at an end of said arm for placing mold charges into molds as said molds pass in sequence adjacent to said periphery of said plate.

23. The apparatus set forth in claim 22 wherein said mold charge placement mechanism includes a driven shaft for rotation around said second axis, with said arm extending from said driven shaft at an angle to said second axis.

24. The apparatus set forth in claim 23 wherein said arm is perpendicular to said second axis.

25. The apparatus set forth in claim 23 wherein said mold charge placement mechanism includes a cutter blade for cutting mold charges from a nozzle, said cup receiving mold charges cut by said blade and carrying the mold charges for placement into the molds.

26. The apparatus set forth in claim 25 wherein said cutter blade is carried by said mold charge placement mechanism.

27. The apparatus set forth in claim 25 wherein said nozzle is spaced from said first axis, and wherein said cutter blade is coupled by an arm to a blade shaft for rotation around a third axis parallel to said first axis.

28. The apparatus set forth in claim 27 including a motor coupled to said blade shaft and to said plate for rotating said cutter blade and said plate simultaneously.

29. The apparatus set forth in claim 25 including a control for selectively applying vacuum to said cup to retain the mold charge in said cup.

30. The apparatus set forth in claim 29 wherein said control also selectively applies air under pressure to said cup to assist placement of the mold charge into a mold.

31. The apparatus set forth in claim 25 including a collar coupled to said plate, a gear shaft extending through said collar and said plate, and gears coupling said gear shaft to said driven shaft.

32. The apparatus set forth in claim 31 including mold charge placement mechanisms diametrically spaced from each other adjacent to a periphery of said plate, both of said placement mechanisms including driven shafts coupled by gears to said gear shaft.

33. The apparatus set forth in claim 31 wherein said cutter blade is carried by said mold charge placement mechanism.

34. The apparatus set forth in claim 31 wherein said nozzle is spaced from said first axis, and wherein said cutter blade is coupled by an arm to a blade shaft for rotation around a third axis parallel to said first axis.

35. Apparatus for placing mold charges into compression molds in sequence, which includes:

a circular plate for rotation around a first axis and having a periphery adjacent to a path of travel of compression molds in sequence, a plurality of mold charge placement mechanisms angularly spaced from each other around said periphery of said plate, and a cutter blade for severing mold charges from a nozzle as said cutter blade passes across the nozzle, each of said mold charge placement mechanisms including a driven shaft for rotation around a second axis perpendicular to said first axis, an arm extending from said driven shaft at an angle to said second axis and a cup at an end of said arm, said cup receiving mold charges severed by said blade, transporting the mold charges and placing the mold charges into molds as the molds pass in sequence adjacent to the periphery of said plate.

36. The apparatus set forth in claim 35 including a control for selectively applying vacuum to said cups to retain the mold charges in said cups.

37. The apparatus set forth in claim 36 wherein said control also selectively applies air under pressure to said cups to assist placement of the mold charges into molds.

38. The apparatus set forth in claim 35 including a collar coupled to said plate, a gear shaft extending through said collar and said plate, and gears coupling said gear shaft to the driven shafts of said mold charge placement mechanisms.

39. The apparatus set forth in claim 38 wherein said mold charge placement mechanisms are diametrically spaced from each other adjacent to a periphery of said plate, both of said placement mechanisms including driven shafts coupled by gears to said gear shaft.

40. The apparatus set forth in claim 38 wherein said gear shaft is stationary.

41. The apparatus set forth in claim 38 wherein said cutter blade is carried by said mold charge placement mechanism.

42. The apparatus set forth in claim 38 wherein said nozzle is spaced from said first axis, and wherein said cutter blade is coupled by an arm to a blade shaft for rotation around a third axis parallel to said first axis.

43. The apparatus set forth in claim 42 including a motor coupled to said blade shaft and to said plate for rotating said cutter blade and said plate simultaneously.

44. A machine for compression molding plastic articles, which includes:

a first array of compression molds and a second array of compression molds different from said first array, both of said arrays being mounted on a support for movement through respective first and second differing mold paths, each of said molds including mold segments, at least one of which is movable between a closed position and an open position for removing a molded article from said mold and placing a mold charge into said mold, a first mold charge placement mechanism disposed adjacent to said first path for placing mold charges into molds of said first array in sequence, and a second mold charge placement mechanism disposed adjacent to said second path for placing mold charges into molds of said second array in sequence independently of said first mechanism.

45. The machine set forth in claim 44 wherein operation of said first and second mold charge placement mechanisms is synchronized to movement of said support.

46. The machine set forth in claim 45 wherein said support includes a wheel mounted for rotation around a horizontal axis, said first and second arrays of compression molds being disposed on axially opposed sides of said wheel.

* * * * *